Patented Jan. 16, 1934

1,943,872

UNITED STATES PATENT OFFICE 1,943,872

ARYLAMINO-1-HYDROXY-NAPHTHALENE-2-CARBOXYLIC ACIDS

Leopold Laska and Oskar Haller, Offenbach-on-the-Main, Germany, assignors to General Aniline Works, Inc., New York, N. Y., a corporation of Delaware No Drawing. Application February 23, 1933, Serial No. 658,241, and in Germany February 27, 1932

4 Claims. (Cl. 260—109)

The present invention relates to arylamino-1-hydroxynaphthalene-2-carboxylic acids; more particularly it relates to compounds corresponding to the following general formula:

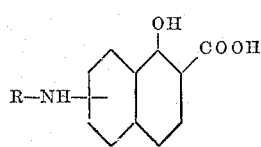

wherein R stands for a radical of the benzene series.

The process in accordance with this invention consists in heating with carbon dioxide, at a raised pressure, an alkali metal salt of 1-hydroxynaphthalene containing in 5-, 6-, 7- or 8-position an aryl-amino-group.

The carboxylic acids, thus obtained, exhibit intense colorations when their alcoholic solutions are mixed with a ferric chloride solution. By reason of these properties, the carboxylic acid group is assumed to have entered the ortho-position to the hydroxy group.

The following example serves to illustrate the invention, but it is not intended to limit the invention thereto, the parts being by weight:

235 parts of 1-hydroxy-7-phenylaminonaphthalene are dissolved in 56 parts of potassium hydroxide and 1000 parts of water in an autoclave provided with a stirrer; the water is then distilled under reduced pressure until the potassium salt obtained is completely dried. After cooling of the reaction mass, carbon dioxide is introduced into the reaction vessel while gradually increasing the pressure to 80 to 100 atmospheres, and the whole is heated to 200° C. After heating for about 10 hours, the reaction has finished. The melt is allowed to cool and then dissolved in water, the solution is filtered and the carboxylic acid is precipitated from the filtrate by means of dilute hydrochloric acid. The carboxylic acid may be further purified by dissolving it in sodium acetate solution and precipitating it therefrom by means of an acid. It crystallizes from xylene or dichlorobenzene, has a yellow color and melts at 199° C. It gives in dilute alcoholic solution a green coloration on the addition of a few drops of dilute ferric chloride solution.

By reason of these properties, the carboxylic acid is assumed to be the 7-phenylamino-1-hydroxynaphthalene-2-carboxylic acid which corresponds to the following formula:

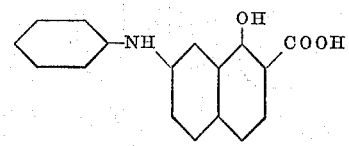

The reaction may be carried out in the same manner by using the sodium salt of 7-phenylamino-1-hydroxynaphthalene.

The following table shows the properties of some other arylamino-1-hydroxy-naphthalene-2-carboxylic acids which may be prepared according to the present invention:

| | Color | Recrystallized from | Melting point | Coloration when mixed with ferric chloride solution |
|---|---|---|---|---|
| 7 - p - tolylamino - 1 - hydroxynaphthalene - 2 - carboxylic acid | Yellowish-green powder | Chlorobenzene | 203° C. | Dark green |
| 6 - phenylamino - 1 - hydroxynaphthalene - 2 - carboxylic acid | Colorless crystals | Dichlorobenzene | 185° C. | Violet |
| 6 - p - tolylamino - 1 - hydroxynaphthalene - 2 - carboxylic acid | Colorless crystals | Chlorobenzene | 199° C. | Violet |
| 5 - phenylamino - 1 - hydroxynaphthalene - 2 - carboxylic acid | Yellow powder | Chlorobenzene | 198° C. | Green |
| 5 - p - tolylamino - 1 - hydroxynaphthalene - 2 - carboxylic acid | Brownish-yellow powder | Chlorobenzene | 188° C. | Green |
| 8 - phenylamino - 1 - hydroxynaphthalene - 2 - carboxylic acid | Yellow leaflets | Chlorobenzene | 185° C. | Blue |

We claim:
1. The arylamino-1-hydroxy-naphthalene-2-carboxylic acids of the general formula:

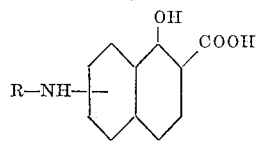

wherein R stands for a radical of the benzene series, which compounds have a definite melting point, are soluble in alkalies and exhibit intense colorations when their alcoholic solutions are mixed with a dilute solution of ferric chloride.

2. The 7-phenylamino-1-hydroxynaphthalene-2-carboxylic acid of the following formula:

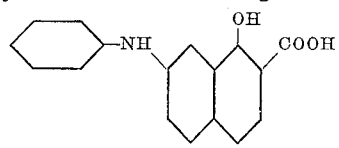

which compound melts, when recrystallized from xylene or dichlorobenzene, at 199° C., is soluble in alkalies and exhibits a green coloration when its alcoholic solution is mixed with a dilute solution of ferric chloride.

3. The 6-para-tolylamino-1-hydroxynaphthalene-2-carboxylic acid of the following formula:

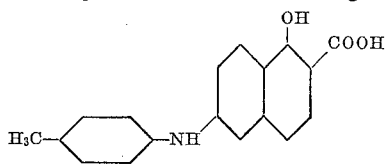

which compound melts, when recrystallized from chlorobenzene, at 199° C., is soluble in alkalies and exhibits a violet coloration when its alcoholic solution is mixed with a dilute solution of ferric chloride.

4. The 5-phenylamino-1-hydroxynaphthalene-2-carboxylic acid of the following formula:

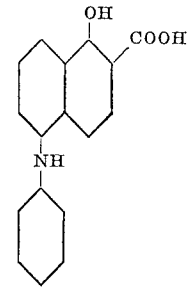

which compound melts, when recrystallized from chlorobenzene, at 198° C., is soluble in alkalies and exhibits a green coloration when its alcoholic solution is mixed with a dilute solution of ferric chloride.

LEOPOLD LASKA.
OSKAR HALLER.